(12) United States Patent
Hartman (10) Patent No.: US 12,528,590 B2
(45) Date of Patent: Jan. 20, 2026

(54) PARACHUTE SYSTEMS AND RISER ATTACHMENTS THEREOF

(71) Applicant: Rockwell Collins, Inc., Cedar Rapids, IA (US)

(72) Inventor: Matthew Hartman, Peyton, CO (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 42 days.

(21) Appl. No.: 18/638,794

(22) Filed: Apr. 18, 2024

(65) Prior Publication Data

US 2025/0326489 A1    Oct. 23, 2025

(51) Int. Cl.
*B64D 17/30* (2006.01)
*B64D 17/24* (2006.01)

(52) U.S. Cl.
CPC ............. *B64D 17/30* (2013.01); *B64D 17/24* (2013.01)

(58) Field of Classification Search
CPC ......... B64D 17/30; B64D 17/24; B64D 17/40
See application file for complete search history.

(56) References Cited

U.S. PATENT DOCUMENTS

| | | | | |
|---|---|---|---|---|
| 1,958,000 A | * | 5/1934 | Hamer | B64D 17/30 244/148 |
| 3,279,012 A | * | 10/1966 | David | B64D 17/30 24/200 |
| 4,720,064 A | * | 1/1988 | Herndon | B64D 17/30 244/122 AG |
| 4,850,554 A | | 7/1989 | Strong | |
| 5,277,348 A | * | 1/1994 | Reid | B64D 17/30 244/151 R |
| 9,586,688 B2 | * | 3/2017 | Blignaut | B64D 17/30 |
| 2009/0071749 A1 | * | 3/2009 | Burlaud | A62B 35/04 57/210 |
| 2011/0127381 A1 | * | 6/2011 | Fradet | B64D 17/30 244/151 R |
| 2023/0249835 A1 | * | 8/2023 | Fradet | B64D 17/30 244/151 A |

FOREIGN PATENT DOCUMENTS

FR    2950321 A1    3/2011

\* cited by examiner

*Primary Examiner* — Justin M Benedik
(74) *Attorney, Agent, or Firm* — CANTOR COLBURN LLP (57) ABSTRACT

Parachute systems and harness assemblies for parachute systems include a harness having a shoulder portion, a front portion, a back portion, and a leg portion, a fitting strap attached to the shoulder portion, with a gap defined between the fitting strap and the shoulder portion, and a riser attachment is movably attached between the shoulder portion and the fitting strap, the riser attachment free to move from a first position on a front of the harness to a second position aft of the first position along a path defined by the gap.

18 Claims, 7 Drawing Sheets

PARACHUTE SYSTEMS AND RISER ATTACHMENTS THEREOF

BACKGROUND

The subject matter disclosed herein generally relates to parachute systems and, more particularly, to riser attachments between risers and harnesses of parachute systems.

In both sports parachute jumping and accuracy jumping, a parachute harness is suspended under a canopy by a pair of riser straps. The riser straps connect to shoulder straps of the harness at anchor points. Such an attachment has proven successful because of the fact that upon initial deployment of the canopy, the harness is loaded at the anchor points to thus, with proper prejump adjustment, load the harness evenly and maintain the jumper at a generally favorable orientation during deployment, descent, and landing. Some of the shortcomings of such parachute harnesses include the fact that suspension of the jumper from single riser straps inherently restricts the degree of adjustment which may be achieved for varying the orientation and attitude of the jumper's body relative to the canopy during descent. Moreover, the anchoring of the individual riser straps at respective anchor points on the shoulder straps of the harness creates inherent pivot points about which the jumper tends to oscillate to and fro during descent and landing.

Furthermore, in the case of ejection seats and associated parachutes, injury to crew members (e.g., human user) may occur during parachute recovery phase, which is dependent upon a direction of applied acceleration. The recovery phase is the period of time from when the parachute deploys from a packed configuration at the time of initiation of an ejection operation, through various states of reefed, dis-reefed filling, fully filled/deployed, to the time the user lands on the earth surface. As a crew member is ejected from a craft, a parachute may be deployed from the seat (also ejected from the craft). The parachute is connected to the harness of the crew member and as the parachute is deployed, the risers of the parachute will cause force to be applied to the human body, which have load limits which should not be exceeded to prevent injury to the crew member. During ejection and deployment, the ideal load is applied upward and backward, relative to the facing of the crew member, which ensures application of force along the highest tolerance limits of the human body.

Current harness attachments are placed on the front of the crew member using the harness which locates the attachment points along the chest of the user, and below each collar bone. Due to this attachment location, aft pitch of the crew member may occur, as the harness is pulled from the front of the body of the crew member. Aft pitch drives forward-backward accelerations, and particularly, aft pitch drives positive forward acceleration which can cause potential injury to the crew member. Further, head movement may be observed during the recovery phase due to the direction of load application, and aft pitch can result in hyperextension and/or flexion of the neck due to head movement. Accordingly, it may be beneficial to develop improved parachute systems to avoid injury and risks associated with deployment of parachutes.

SUMMARY

According to some embodiments, harness assemblies for parachute systems are provided. The harness assemblies include a harness having a shoulder portion, a front portion, a back portion, and a leg portion, a fitting strap attached to the shoulder portion, a gap defined between the fitting strap and the shoulder portion, and a riser attachment movably attached between the shoulder portion and the fitting strap, the riser attachment free to move from a first position on a front of the harness to a second position aft of the first position along a path defined by the gap.

In addition to one or more of the features described herein, or as an alternative, further embodiments of the harness assemblies may include that the second position is a center position on the shoulder portion.

In addition to one or more of the features described herein, or as an alternative, further embodiments of the harness assemblies may include that the center position is configured to align with the spine of a user when the harness assembly is worn by the user.

In addition to one or more of the features described herein, or as an alternative, further embodiments of the harness assemblies may include that the shoulder portion comprises a right side and a left side, wherein each of the right side and the left side have a respective fitting strap attached thereto.

In addition to one or more of the features described herein, or as an alternative, further embodiments of the harness assemblies may include that the riser attachment is a first riser attachment that is movably attached to the right side of the shoulder portion, the harness assembly further comprising a second riser attachment that is movably attached to the left side of the shoulder portion.

In addition to one or more of the features described herein, or as an alternative, further embodiments of the harness assemblies may include a shoulder support, wherein the shoulder portion is supported on the shoulder support.

In addition to one or more of the features described herein, or as an alternative, further embodiments of the harness assemblies may include that the fitting strap is formed from a composite material.

In addition to one or more of the features described herein, or as an alternative, further embodiments of the harness assemblies may include that the gap is defined from a forward position to a rear position along the shoulder portion.

In addition to one or more of the features described herein, or as an alternative, further embodiments of the harness assemblies may include that the gap extends 90° from the forward position to the rear position, wherein the forward position is at a front of the shoulder portion the rear position is at an apex of the shoulder portion.

In addition to one or more of the features described herein, or as an alternative, further embodiments of the harness assemblies may include that the gap extends 180° from the forward position to the rear position, wherein the forward position is at a front of the shoulder portion and the rear position is at a back of the shoulder portion.

According to some embodiments, parachute systems are provided. The parachute systems include a harness assembly having a first shoulder portion and second shoulder portion, a riser assembly comprising a first riser strap and a second riser strap, the riser assembly movably attached to the harness assembly, and a parachute assembly attached to the riser assembly. The system further includes a first fitting strap on the first shoulder portion wherein a first gap is defined between the first fitting strap and the first shoulder portion, a second fitting strap on the second shoulder portion, wherein a second gap is defined between the second fitting strap and the second shoulder portion, a first riser attachment movably connected to the first fitting strap at a first end and movable along the first gap, and fixedly connected to the first riser strap at a second end, and a second riser attachment movably connected to the second fitting strap at a first end and movable along the second gap, and fixedly connected to the second riser strap at a second end, wherein each of the first gap and the second gap have a length selected to allow the respective riser attachments to travel from respective first positions to respective second positions along the respective shoulder portions.

In addition to one or more of the features described herein, or as an alternative, further embodiments of the parachute systems may include that the second position is a center position on the shoulder portion.

In addition to one or more of the features described herein, or as an alternative, further embodiments of the parachute systems may include that the center position is configured to align with the spine of a user when the harness assembly is worn by the user.

In addition to one or more of the features described herein, or as an alternative, further embodiments of the parachute systems may include a shoulder support, wherein the shoulder portion is supported on the shoulder support.

In addition to one or more of the features described herein, or as an alternative, further embodiments of the parachute systems may include that the harness assembly further comprising a first front portion extending from the first shoulder portion and a second front portion extending from the second shoulder portion.

In addition to one or more of the features described herein, or as an alternative, further embodiments of the parachute systems may include that the first positions of the first and second riser attachments are proximate the respective front portions.

In addition to one or more of the features described herein, or as an alternative, further embodiments of the parachute systems may include that the parachute assembly includes a canopy, a first set of suspension lines connecting the canopy to the first riser strap, and a second set of suspension lines connecting the canopy to the second riser strap.

In addition to one or more of the features described herein, or as an alternative, further embodiments of the parachute systems may include that the first riser strap defines a right-side riser strap that is the only riser strap on a right-side of the harness assembly that connects to the parachute assembly and the second riser strap defines a left-side riser strap that is the only riser strap on a left-side of the harness assembly that connects to the parachute assembly.

In addition to one or more of the features described herein, or as an alternative, further embodiments of the parachute systems may include that the gap is defined from a forward position to a rear position along the shoulder portion, wherein the gap extends 90° from the forward position to the rear position, wherein the forward position is at a front of the shoulder portion the rear position is at an apex of the shoulder portion.

In addition to one or more of the features described herein, or as an alternative, further embodiments of the parachute systems may include that the gap is defined from a forward position to a rear position along the shoulder portion, wherein the gap extends 180° from the forward position to the rear position, wherein the forward position is at a front of the shoulder portion and the rear position is at a back of the shoulder portion.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Parachutes are used as safety devices for crew or other users (e.g., flight crew, pilots, and other parachutes jumpers) to provide a mechanism to safely return a user to the Earth's surface, such as from an ejection from an aircraft. During deployment of a parachute, the human body is subjected to various forces which are applied to the human body through a harness worn by the user. The harness may include one or more attachment points for attaching to risers that connect to suspension lines, which in turn connect to a parachute canopy. For example, with reference to FIG. 1, a schematic illustration of a user 100 using a parachute 102 is shown. The user 100 is illustrated as secured within a seat 104 which may be an aircraft seat or the like. The user 100 is also wearing a harness 106, which attaches to the parachute 102. During an ejection event, such as when ejecting from an aircraft, the user 100 may manually deploy the parachute 102 or the parachute 102 may automatically deploy during an ejection event.

Figure 1:
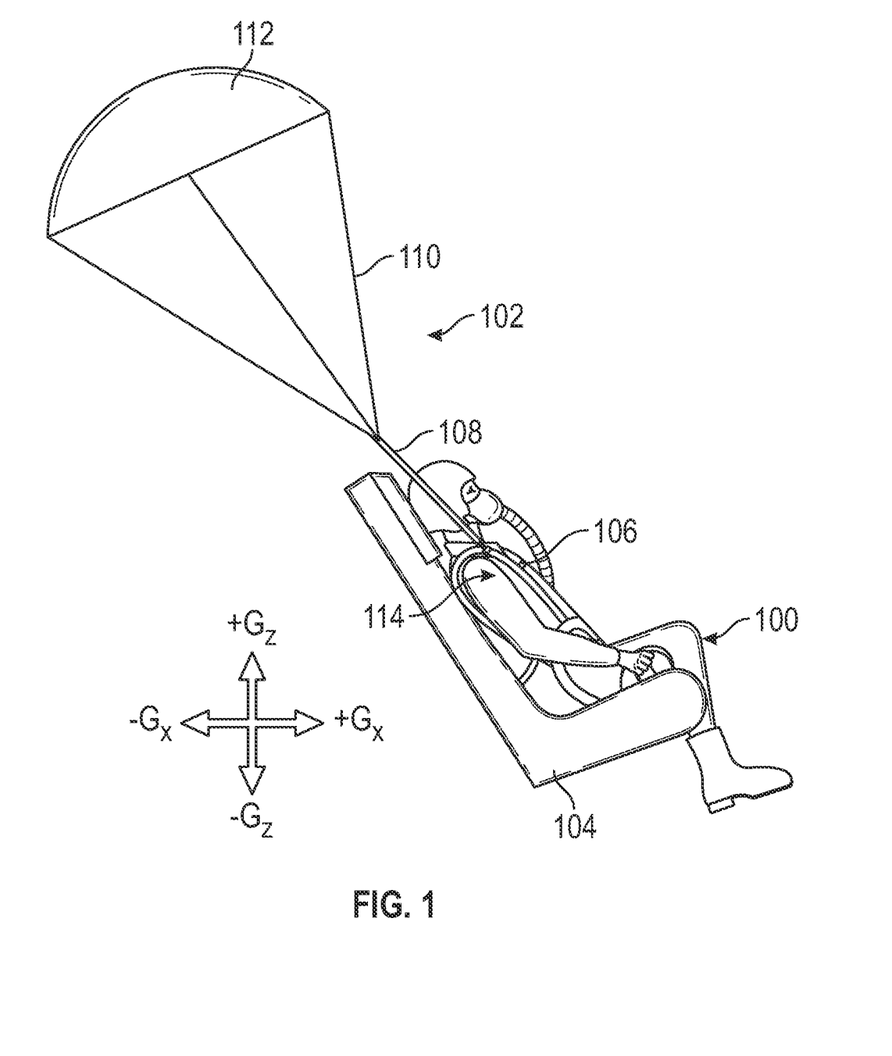
FIG. 1 is a schematic illustration of a parachute system that may incorporate embodiments of the present disclosure.

The parachute 102 connects to the harness 106 by one or more risers 108. The risers 108 connector to one or more suspension lines 110, which in turn connect to a canopy 112. The risers 108 attached to the harness 106 at one or more attachment points 114. It will be appreciated that other components may be incorporated within a parachute system, although such components are not illustrated for simplicity. As the parachute 102 is deployed and opened, the user 100 will be acted upon by forces due to changes in direction and acceleration. Injury to the user 100 may occur during parachute recovery phase due to the direction of applied acceleration. Human acceleration tolerance limits for load application through the risers 108 to the harness 106 are at maximum for load applications in the $+G_z$ and the $-G_x$ directions. That is, the ideal load application, relative to a human body, is upward and backward relative to a front facing of the user 100. As used herein, a force applied in the direction of facing of a user is a $+G_x$ direction, a backward force is $-G_x$, upward force is $+G_z$, downward force is $-G_z$, and side-to-side forces are $\pm G_y$ (e.g., left and right direction relative to a front facing of the user 100).

Pursuant to conventional harness and parachute configurations, attachment points 114, where the riser 108 attaches to the harness 106, are fixed in position. For example, under conventional harness configurations, the attachment points 114 may be fixed in place in front of the user 100 along the chest and below each collar bone. Due to these attachment points 114, aft pitch of the user 100 is often observed due to the harness 106 being pulled from the front of the user 100. Aft pitch drives $+G_x$ accelerations which can link to injury as the $+G_x$ axis has a low human tolerance limit (i.e., lowest tolerances are $+G_x$ and $\pm G_y$). Additional head movement of the user 100 may be observed during the recovery phase due to the direction of load application. Furthermore, aft pitch can result in hyperextension and the location of the attachment points 114 of the risers 108 increases the amount of head movement of the user 100. Head movement has been shown to be a leading driver in neck injury from hyperextension/flexion of the neck due to excessive head movement. As noted above, ideal load application relative to human acceleration tolerance limits through the parachute risers 108 to the aircrew harness 106 is a load application is $-G_x$, $+G_z$ directions (i.e., "back and up") as the human body has higher tolerance limits along these axes.

In view of this and other considerations, embodiments of the present disclosure are directed to improving force and load application to a human body through adjusting where the force is applied. For example, in accordance with some embodiment of the present disclosure, the attachments points 114 may be adjusted, adjustable, or variable, to change the location at which forces are applied through the risers 108, into the harness 106, and as experienced by the body of the user 100. Although illustrated in FIG. 1 with the user 100 in the seat 104, it will be appreciated that embodiments of the present disclosure are not limited to seat-based configurations, and the harnesses and parachute configurations described herein may be employed for non-seat applications (e.g., parachuting without the seat 104).

Figure 2A:
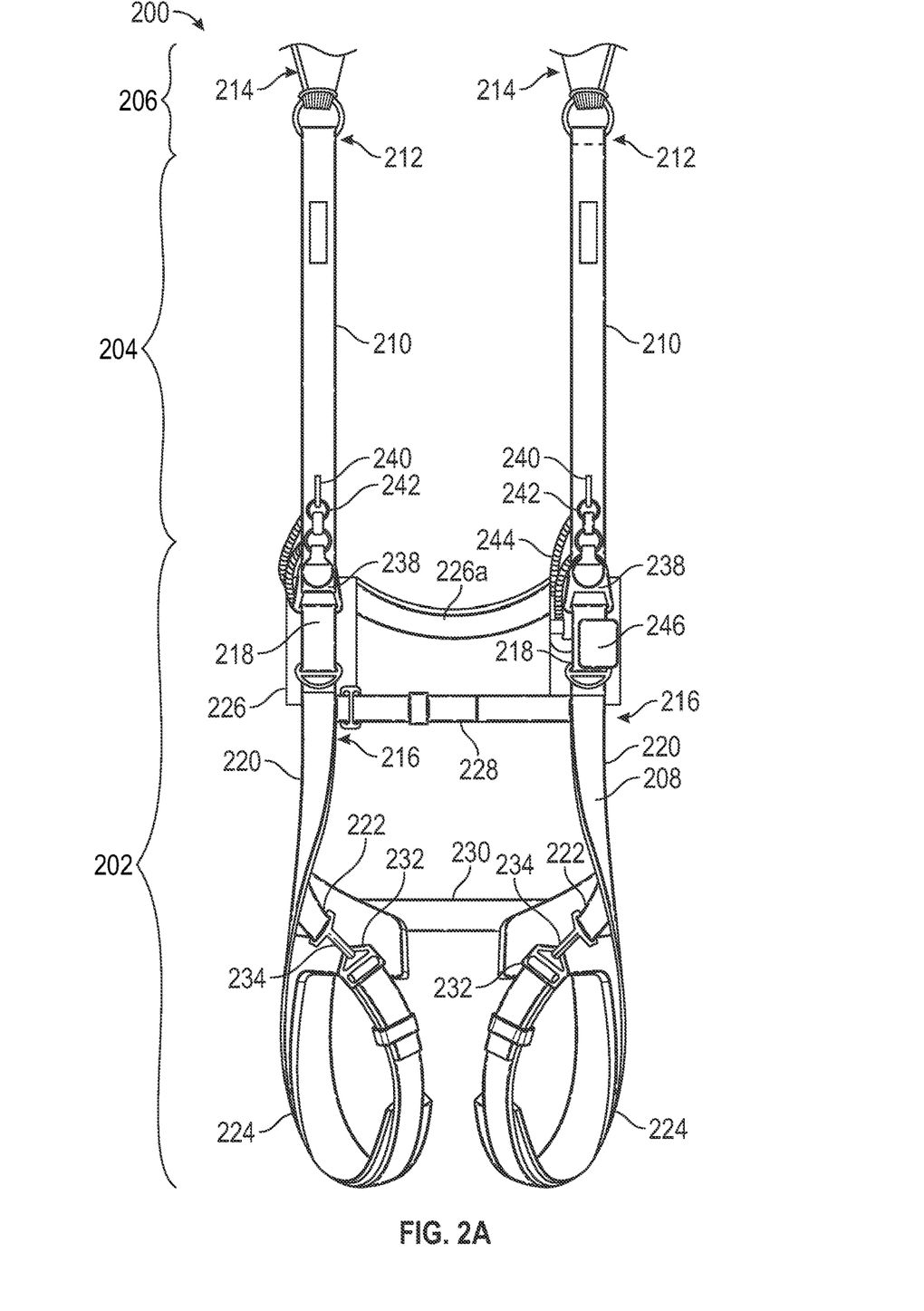
FIG. 2A is a front elevation view of a parachute system in accordance with an embodiment of the present disclosure.
Figure 2B:
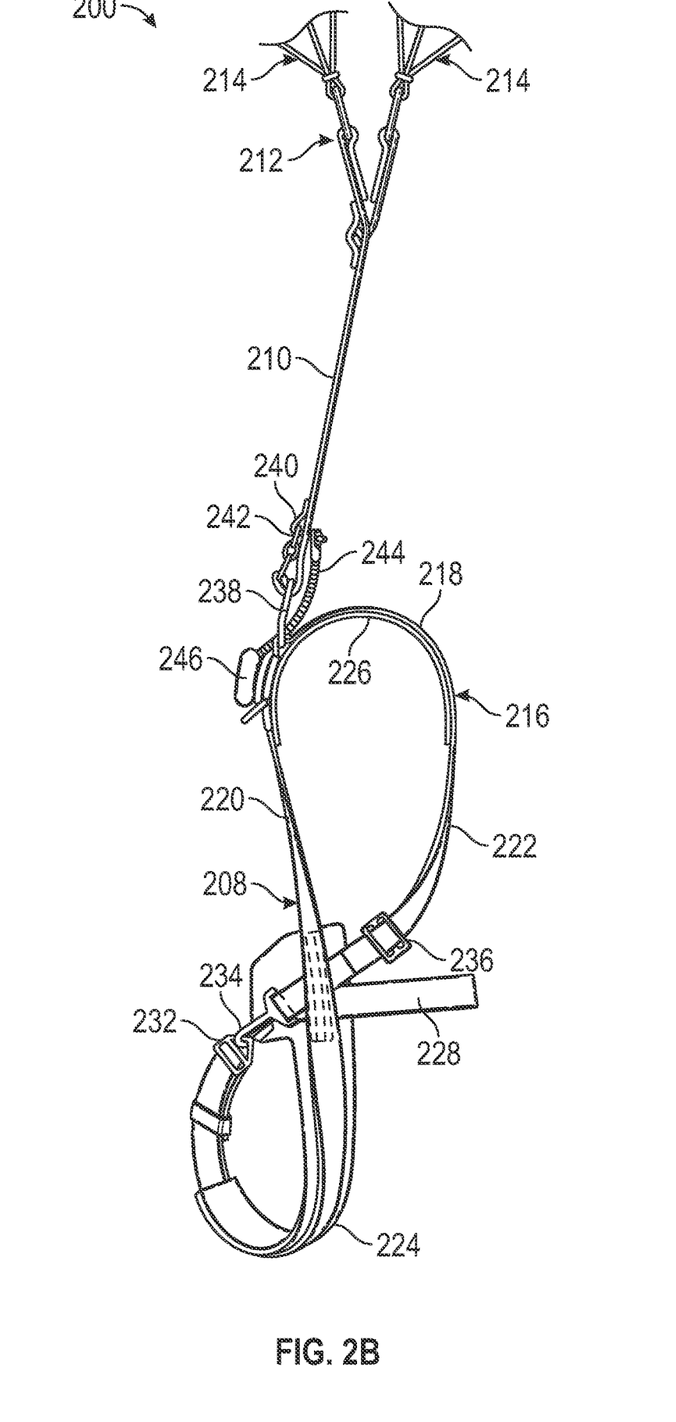
FIG. 2B is a side elevation view of the parachute system of FIG. 2A.
Figure 2C:
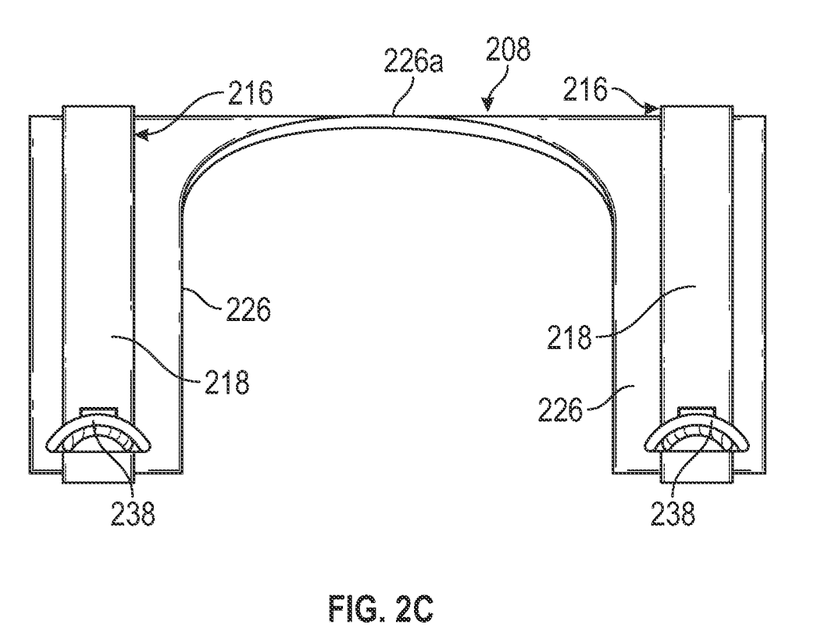
FIG. 2C is a top-down view of the harness assembly of the parachute system of FIG. 2A.

Referring now to FIGS. 2A-2C, schematic illustrations of a parachute system 200 in accordance with an embodiment of the present disclosure are shown. FIG. 2A is a front elevation view of the parachute system 200, FIG. 2B is a side elevation view of the parachute system 200, and FIG. 2C is a top-down view of a harness assembly 202 thereof.

As generally illustrated in FIG. 2A, the parachute system 200 includes a harness assembly 202, a riser assembly 204, and a parachute assembly 206. The harness assembly 202 includes a harness 208 and various components as shown and described herein. The harness 202 is configured to be worn by a user and provides a wearable structure that securely fits to the user's body and provides for a secure connection to the parachute assembly 206 through the riser assembly 204. The riser assembly 204 provides a connection or attachment mechanism between the harness assembly 202 and the parachute assembly 206 and includes riser straps 210 (e.g., left and right shoulders/sides). The riser straps 210 connect to the harness assembly 204 at one end and connect to the parachute assembly 206 at an opposite end. At the connection to the parachute assembly 206, one or more couplers 212 securely attach the respective riser straps 210 to one end of suspension lines 214 of the parachute assembly 206. At an opposite end of the suspension lines 214 is a canopy, as will be appreciated by those of skill in the art.

The harness assembly 202 includes the harness 208 that is formed from a set of harness straps 216 or the like that are attached together to be worn by a user. Anchored at the tops of each of the harness straps 216 are the riser straps 210, respectively. The risers straps 210 are connected on their top ends to the respective suspension lines 214, which in turn connect to a parachute canopy.

The harness straps 216 include shoulder portions 218, chest portions 220, back portions 222, and leg portions 224. The shoulder portions 218 are configured to pass over the tops of the shoulders of a user and may be supported on or by a shoulder support 226. The shoulder support 226 may be a pad or similar element that provides cushioning or padding between parts of the harness straps 216 and a user. Further, the shoulder support 226 may be configured to provide load distribution and may include a back support section 226a that extends across the back of the user and connects the two portions of the shoulder support 226 that sit on the shoulders of a user. On the front of the harness 208 is a chest strap 228 that connects the chest portions 220 of the harness straps 216 across the front of a user. A rear strap 230 may be provided to connect across the back of the user and connect the leg portions 224.

The harness 208 is thus formed of shoulder portions 218 that may rest on a user's shoulders. The harness 208 extends downwardly over opposite sides of the shoulders with the chest portions 220 and the back portions 222. The chest portions 220 extend the harness 208 outside the thighs and behind the user's backside to pass under the user's upper leg and loop upwardly on the inside of the user's thighs to attach with the back portions 222 in the front of the user with buckles 232. The back portions 222, in this illustrative configuration, include free ends having respective snaps 234 which engage and secure to the respective buckles 232. Each of the back portions 222 may include optional length adjustment buckles 236 such that the lengths thereof may be adjusted to adjust the attitude of the user in the harness 208. It will be appreciated that various types of releasable and/or adjustable connections, including buckles, snaps, and the like, may be employed in harnesses in accordance with embodiments of the present disclosure, and the illustrated configuration is merely for explanatory purposes.

In accordance with some embodiments of the present disclosure, and as shown in FIGS. 2A-2C, the riser straps 210 are connected at a location on the front or forward side of the user. As shown, the riser straps 210 connect to the harness 208 at a location between the should portion 218 and the chest portion 220. The riser straps 210 attached to the harness 208 by means of riser attachments 238. The riser attachments 238 may be ring fittings, buckles, or the like, as will be appreciated by those of skill in the art. The connection between the riser straps 210 and the riser attachments 238 is made by means of a toggle strap 240 secured to the riser strap 210 and passing through a locking ring 242 to pass through a grommet (not shown) in the structure of the riser strap 210 and is formed on its free extremity with a grommet through which the holding end of a rip cord 244 projects. The rip cords 244 connect with a handle 246 mounted on the front of the harness 208 for convenient grasping by the user in flight such that the riser straps 210 may be released from the harness 208 for disengagement of the main canopy in the event of entanglement or the like.

In accordance with embodiments of the present disclosure, a single riser strap 210 is attached to the harness 208 at each shoulder portion 218. As noted, the connection is arranged on the front of the harness, proximate a user's upper chest and around the location of a user's collarbone. As discussed above, during deployment of a parachute, this location of connection may cause additional force and acceleration which may cause a user to rotate due to the application of force on the front of the user. However, embodiments of the present disclosure are directed to a harness assembly for a parachute that allows for a change of location of force application. Specifically, in accordance with embodiments of the present disclosure, the riser attachments 238 that connect the harness 208 to the riser straps 210 are movable along the shoulder portion 218.

Figure 3A:
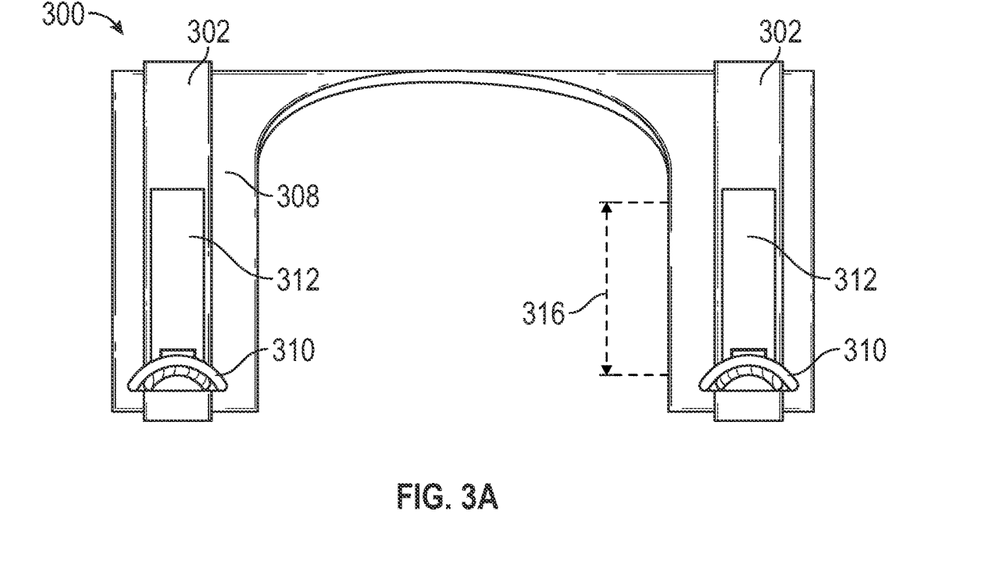
FIG. 3A is a top-down view of a harness assembly in a first position in accordance with an embodiment of the present disclosure.
Figure 3B:
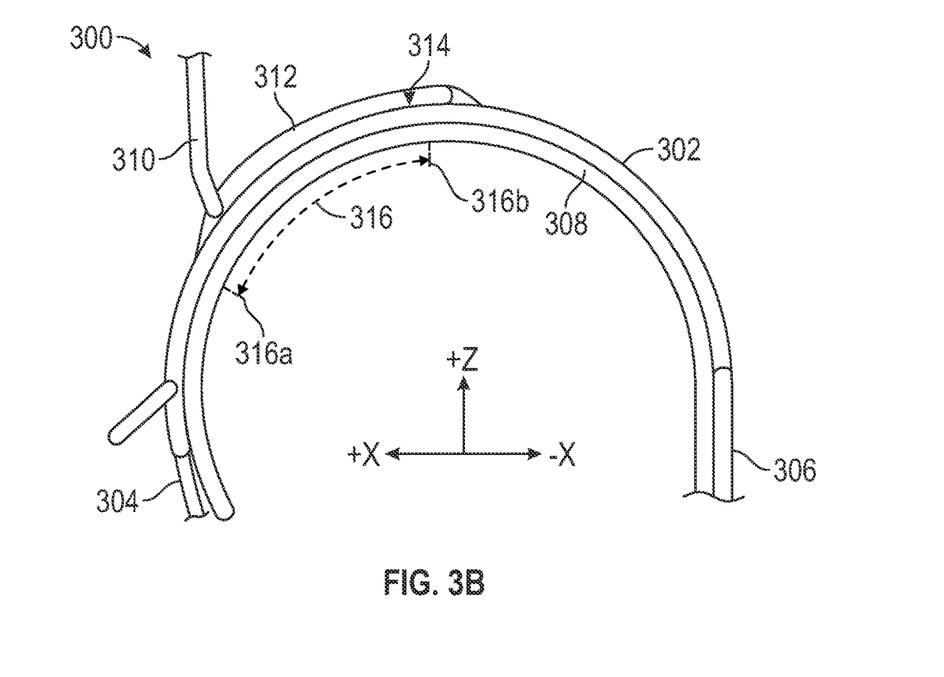
FIG. 3B is a side view of the harness assembly of FIG. 3A in the first position.
Figure 3C:
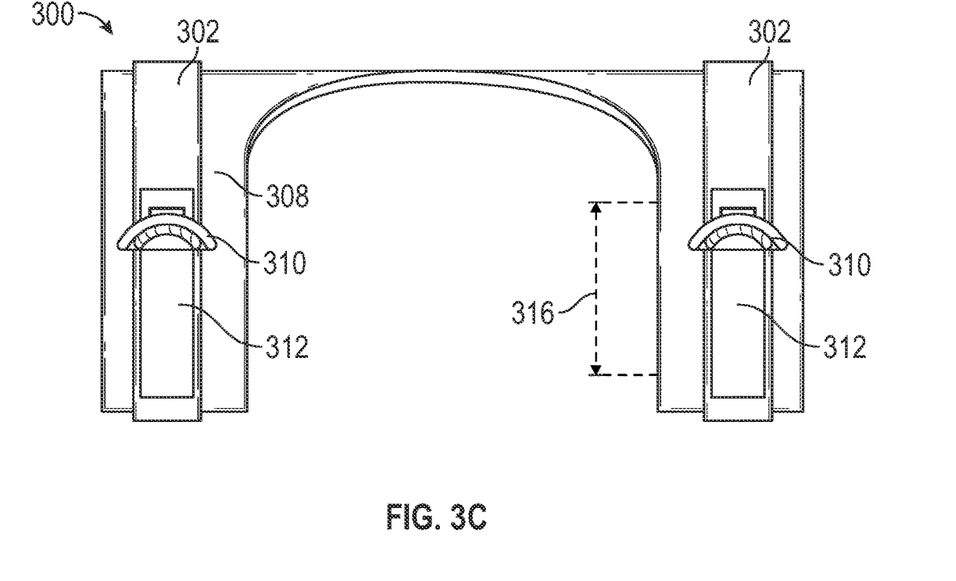
FIG. 3C is a top-down view of a harness assembly in a second position in accordance with an embodiment of the present disclosure.
Figure 3D:
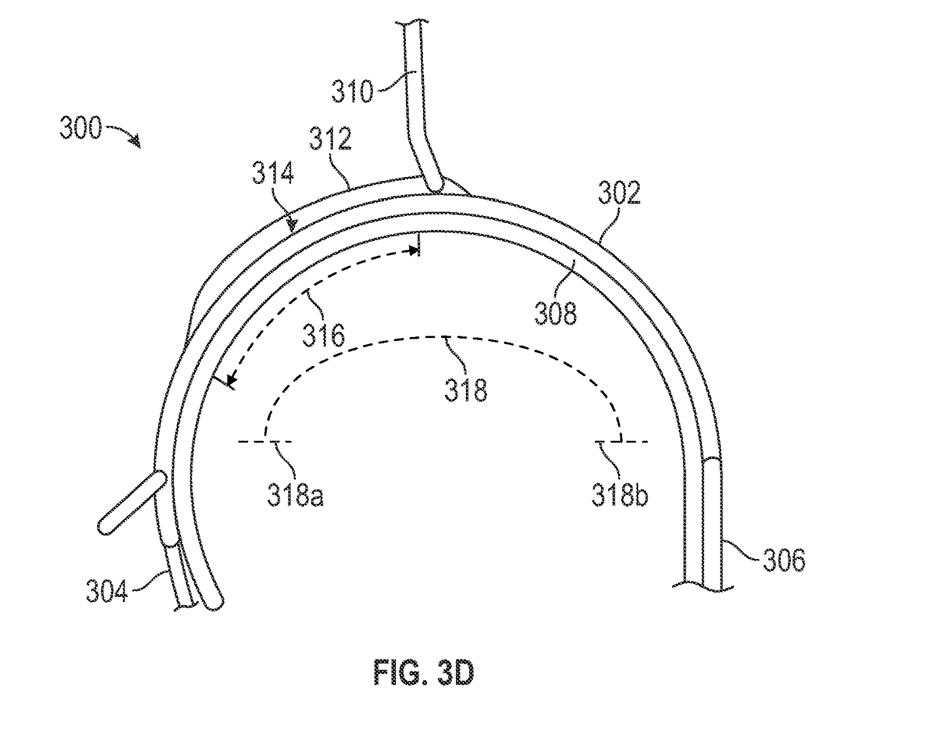
FIG. 3D is a side view of the harness assembly of FIG. 3C in the second position.

For example, with reference to FIGS. 3A-3D, schematic illustrations of a harness assembly 300 in accordance with an embodiment of the present disclosure are shown. FIGS. 3A-3B illustrate the harness assembly 300 in a first state, such as when worn by a user and in normal user (e.g., no deployed parachute). FIGS. 3C-3D illustrate the harness assembly 300 in a second state, such as when worn by a user and a parachute has been deployed. The harness assembly 300 may be similar to that shown and described with respect to FIGS. 2A-2C, and thus certain features are not illustrated or described for simplicity.

The harness assembly 300 includes a shoulder portion 302, a chest portion 304, and a back portion 306. The shoulder portion 302, and parts of the chest portion 304 and/or the back portion 306, may be supported on a shoulder support 308, which may provide padding, cushioning, or the like as described above. A riser attachment 310 is movably connected, attached, or mounted to the shoulder portion 302 by a fitting strap 312 provided on each shoulder portion 302. The fitting strap 312 defines a gap 314 between the fitting strap 312 and the shoulder portion 302 along which the riser attachment 310 may travel. As shown, the gap 314 has a length 316 to allow the riser attachment 310 to move or travel from a first position (FIGS. 3A-3B) to a second position (FIGS. 3C-3D). The gap 314 defines a path along which the riser attachment 310 may travel, from a forward position of the shoulder portion 302 (first position) to an aft position of the shoulder portion 302 (second position). Although a specific length 316 is illustrated, with the second position of the riser attachment 310 being at an apex or center position relative to the shoulder portion 302 (e.g., at the top of the shoulder of a user), it will be appreciated that the length 316 may be longer or shorter than that illustrated. For example, in some embodiments, the fitting strap 312 may extend over the shoulder portion 302 and extend at least partially down the back side of the shoulder portion 302. In accordance with some embodiments, and without limitation, the length 316 may have an arc-length about the shoulder of the user of about 12 inches, or other length, selected to allow for approximately 180° of rotation over the shoulder of the user from a forward position 316a to a rear position 316b. The forward position 316a may be positioned on a user about aligned with a collar bone or upper chest of the user, and the rear position 316b may be positioned at a top of the shoulder of the user. Such configuration and length allows for different size users while providing improved force and load application to the user.

The harness assembly 300 provides for a mechanism for adjusting the point of force application when a parachute is deployed. For example, as the parachute is deployed and the riser straps apply force to the riser attachments 310, the riser attachments 310 may travel along the shoulder portion 302 within the gap 314 and to an end of the fitting strap 312. As such, the riser attachments 310 will shift from a location on the front of the user (e.g., proximate the collar bones) to a position that is more aligned with a spine of the user, allowing for improved force application and distribution on the user, while also providing a more stable operation thereof.

The fitting strap 312 may be formed from similar material as the rest of the harness assembly 300 (e.g., similar materials as the shoulder portion 302). In some embodiments, the fitting strap 312 may be formed from a composite material, such as, but not limited to, carbon fiber, nylon, aramid fibers, and the like. It will be appreciated that the riser attachments 310 may be the same as used in conventional parachute systems, and thus modifications thereto may not be required for use with the configurations described herein. In accordance with some embodiments, the length 316 may be selected to provide a 180° rotation from the forward position 316a to an aft or rear position (e.g., rear position 316b). In some configurations, the arc length 316 may be longer than that illustrated. For example, in some embodiments, the forward position 316a may be at a 0° (+X direction), on the front of the user. The gap 314 defined by the fitting strap 312 may then extend upward over the shoulder of the user to about 90° (+Z direction). Finally, in some embodiments, the gap 314 defined by the fitting strap 312 may extend over the shoulder and down the back of the user to a position that is 180° from the forward position (e.g., −X direction). Accordingly, a forward extent of travel of the riser attachments 310 would be about 90° and would be from the forward position 316a to an upright position at the top of the user's shoulder. The rear or aft extend of travel may be from the upright position (90°) down the back of the user to about 180°. Such a 180° extent of travel allows a full range of motion for the riser attachments 310. It will be appreciated that, for a standard user of the harness assembly 300, only the forward extent of motion may be utilized, such as when jumping from an aircraft or the like. However, when used with an ejection seat system, the aircrew or user may be ejected in a variety of orientations, and thus the full range of motion (full 180°) may be used and will change from when the parachute is deployed, while the parachute is reefed, and when the parachute is fully open. The full range of motion is illustrated by length 318, shown in FIG. 3D, extending from a forward position 318a a full 180° to a rear position 318b.

In accordance with embodiments of the present disclosure, the forward attachment or connection between the fitting strap 312 and the material/straps of the harness assembly 300 (e.g., shoulder portion 302) defines a forward stop or extent of motion of the riser attachments 310 within the gap 314. Similarly, the aft or rear attachment or connection between the fitting strap 312 and the material/straps of the harness assembly 300 (e.g., shoulder portion 302) defines a rear or aft stop or extent of motion of the riser attachments 310 within the gap 314. These two end connections/stop allow for the riser attachments 310 to move and adjust position relative to the user as loads are applied from a parachute. As noted above, aircrew orientation during deployment is not consistent which may lead to loads being applied differently to each riser attachment, and these loads often change up until the parachute is fully deployed and fully inflated. Not until full inflation are the riser loads relatively symmetrical. The substantially free movement and motion allows for load distribution to be applied to the user more appropriately to human anatomy while also accommodating for the inconsistent application of force during an ejection event or the like.

Figure 4A:
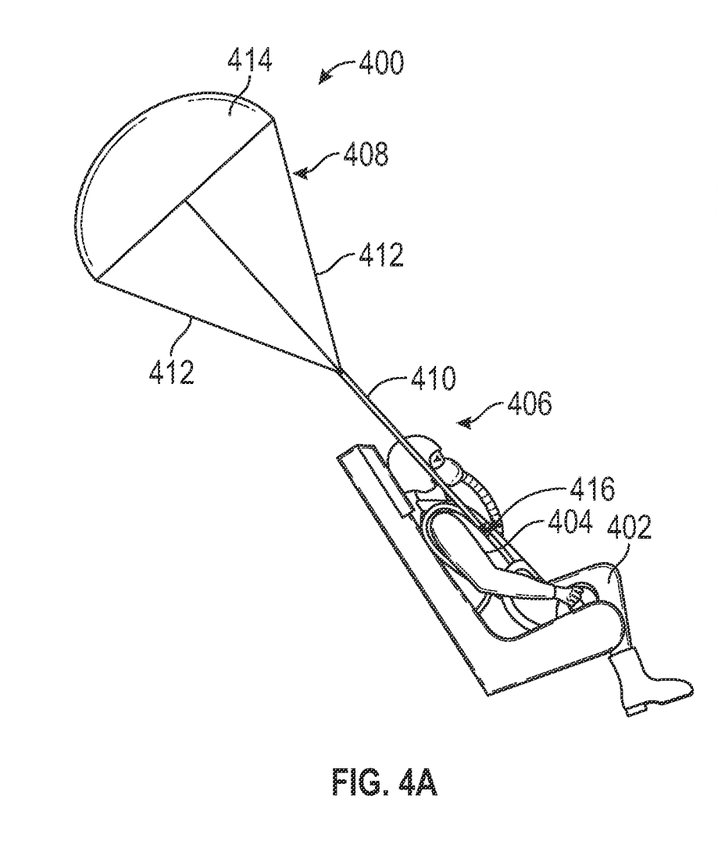
FIG. 4A is a schematic illustration of a parachute system in use in a first position.
Figure 4B:
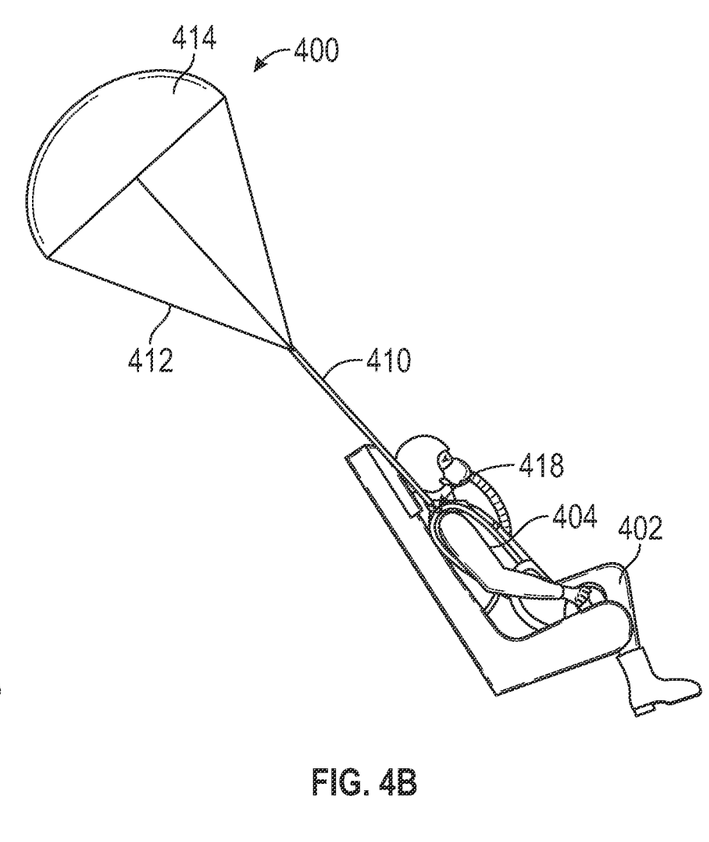
FIG. 4B is a schematic illustration of the parachute system of FIG. 4A in use in a second position.

Referring now to FIGS. 4A-4B, schematic illustrations of a parachute system 400 worn and used by a user 402 in accordance with an embodiment of the present disclosure are shown. FIG. 4A illustrates the state of the parachute system 400 when first deployed by the user 402 and FIG. 4B illustrates the state of the parachute system 400 after deployment. The parachute system 400 includes a harness assembly 404, similar to that shown and described above, a riser assembly 406, and a parachute assembly 408. The riser assembly 406 includes a set of riser straps 410 that connect at one end to the harness assembly 404, such as shown and described above, and connect at the opposite end to suspension lines 412 which in turn connect to a canopy 414 of the parachute assembly 408.

As shown in FIG. 4A, the riser straps 410 connect to the harness assembly 404 at a first position 416, which may be a normal state of operation. The normal state of operation or first position is representative of the position of the connection between the harness assembly 404 and the riser assembly 406 when worn by the user 402 without the parachute assembly 408 deployed. The riser straps 410 connect to the harness assembly 404 by riser attachments that are configured to travel along shoulder portions of the harness assembly 404 within gap defined by a fitting strap, as shown and described with respect to FIGS. 3A-3D.

At the time of deployment of the canopy 414, the riser straps 410 attach or connect to the harness assembly 404 at the first position 416. However, as the canopy 414 fills with air and fully deploys, force will be applied to the suspension lines 412, through the riser straps 410, and to the harness assembly 404. However, because the harness assembly 404 includes the fitting strap described herein, the riser straps 410 may move or slide along the shoulder portions of the harness assembly 404 and transition to a second position 418, shown in FIG. 4B. As illustrated in FIGS. 4A-4B, the point of force application by the riser straps 410 to the harness assembly 404 is shifted from the first position 416 to the second position 418. In the second position 418 (FIG. 4B), the application of force to the user 402 is more aligned with the user's spine than when in the first position 416 (FIG. 4A).

When using a conventional parachute system, the application of force is only at the first position 416, throughout operation and deployment of the canopy 414. During the initial periods of a recovery phase, the user 402 may be pitched aft. The forward attachment of conventional parachute systems will cause additional aft pitch due to a rotation point (e.g., fixed connection point) being off-center from the human body (i.e., at a point on the chest of the user). This applies loads off-axis from the user's spine and can cause the user's head to whip or move forward and/or aft, which can result in damage to the user's neck. However, by implementing a harness assembly as described herein, the attachment point/location between the riser straps 410 and the harness assembly 404 is adjustable. As such, the location of attachment may shift from the first position 416 (e.g., on the front of the body of the user 402) to the second position 418 (e.g., at a top of the shoulder of the user 402). This allows the load to be more in line with the spine of the user 402, thus directing loads to the highest tolerance parts of the human body. Additionally, this arrangement and attachment location (second position 418) can reduce additional aft pitch during the initial periods of the recovery phase and the user 402 is already pitched aft and the parachute is behind or above and behind the user 402. Furthermore, when the point of connection or attachment is at the second position 418, additional or excessive head movement of the user, which can cause hyper-extension/flexion, may be reduced, minimized, or eliminated. After the initial deployment, the riser attachments may be free to move along the gap between the fitting strap and the shoulder portion of the harness assembly 404. Accordingly, more stability may be provided by permitting the riser attachments to move relative to the user 402.

Advantageously, embodiments described herein provide for parachute systems with improved connections between risers assemblies and harness assemblies. In accordance with some embodiments, the riser attachments are permitted to move along a defined path over the shoulder of the user. For example, a riser attachment may be movable between a position on the front of and slightly below the collar bone of a user and a position directly above (or slightly behind) the should of the user. This position change shifts the application of force from a point in front of the user to a point substantially aligned with the spine of the user. Advantageously, embodiments of the present disclosure may be retrofittable to existing harnesses by incorporation or addition of the fitting strap to the shoulder portion thereof.

Embodiments of the present disclosure can reduce risk of injury to users of parachute systems by adjusting the point of application of force between a canopy and a user by means of a riser assembly, a harness assembly, and a riser attachment that is moveable along a shoulder portion of the harness assembly. For example, in accordance with embodiments of the present disclosure, there may be a reduction in $+G_x$ accelerations by moving the point of attachment up and back along the user's body. If the point attachment reaches the top of the shoulder of the user, the x-direction forces may be substantially minimized. Further, advantageously, embodiments of the present disclosure will improve riser strap and user's spine alignment, resulting in a reduction of hyper-extension and/or flexion as compared to conventional systems.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A harness assembly for a parachute system comprising:
a harness having a first shoulder portion, a second shoulder portion, a front portion, a back portion, and a leg portion;
a first fitting strap attached to the first shoulder portion, wherein a first gap is defined between the first fitting strap and the first shoulder portion;
a second fitting strap attached to the second should portion, wherein a second gap is defined between the second fitting strap and the second shoulder portion;
a first riser attachment configured to connect the first fitting strap to a first riser of a parachute assembly, the first riser attachment movably attached between the first shoulder portion and the first fitting strap, the first riser attachment free to move from a respective first position on a front of the harness to a respective second position aft of the respective first position along a path defined by the first gap; and
a second riser attachment configured to connect the second fitting strap to a second riser of the parachute assembly, the second riser attachment movably attached between the second shoulder portion and the second fitting strap, the second riser attachment free to move from a respective first position on a front of the harness to a respective second position aft of the respective first position along a path defined by the second gap.

2. The harness assembly of claim 1, wherein each second position is a center position on the shoulder portion.

3. The harness assembly of claim 2, wherein each center position is arranged to align with the spine of a user when the harness assembly is worn by the user.

4. The harness assembly of claim 1, further comprising a first shoulder support configured to support the first shoulder portion and a second shoulder support configured to support the second shoulder portion.

5. The harness assembly of claim 1, wherein each of the first fitting strap and the second fitting strap is formed from a composite material.

6. The harness assembly of claim 1, wherein the first gap and the second gap are each defined from a forward position to a rear position along the respective shoulder portion.

7. The harness assembly of claim 6, wherein each of the first gap and the second gap extends 90° from the forward position to the rear position along the respective shoulder portion, wherein the forward position is at a front of the respective shoulder portion the rear position is at an apex of the respective shoulder portion.

8. The harness assembly of claim 6, wherein each of the first gap and the second gap extends 180° from the forward position to the rear position along the respective shoulder portion, wherein the forward position is at a front of the respective shoulder portion and the rear position is at a back of the respective shoulder portion.

9. A parachute system comprising:
a harness assembly having a first shoulder portion and second shoulder portion;
a riser assembly comprising a first riser strap and a second riser strap, the riser assembly movably attached to the harness assembly; and
a parachute assembly attached to the riser assembly,
the system further comprising:
a first fitting strap on the first shoulder portion wherein a first gap is defined between the first fitting strap and the first shoulder portion;
a second fitting strap on the second shoulder portion, wherein a second gap is defined between the second fitting strap and the second shoulder portion;
a first riser attachment movably connected to the first fitting strap at a first end and movable along the first gap, and fixedly connected to the first riser strap at a second end;
a second riser attachment movably connected to the second fitting strap at a first end and movable along the second gap, and fixedly connected to the second riser strap at a second end,
wherein each of the first gap and the second gap have a length selected to allow the respective riser attachments to travel from respective first positions to respective second positions along the respective shoulder portions.

10. The parachute system of claim 9, wherein the second position is a center position on the shoulder portion.

11. The parachute system of claim 1, wherein the center position is arranged to align with the spine of a user when the harness assembly is worn by the user.

12. The parachute system of claim 9, further comprising a shoulder support, wherein the shoulder portion is supported on the shoulder support.

13. The parachute system of claim 9, wherein the harness assembly further comprising a first front portion extending from the first shoulder portion and a second front portion extending from the second shoulder portion.

14. The parachute system of claim 13, wherein the first positions of the first and second riser attachments are proximate the respective front portions.

15. The parachute system of claim 9, wherein the parachute assembly comprises:
a canopy;
a first set of suspension lines connecting the canopy to the first riser strap; and
a second set of suspension lines connecting the canopy to the second riser strap.

16. The parachute assembly of claim 9, wherein the first riser strap defines a right-side riser strap that is the only riser strap on a right-side of the harness assembly that connects to the parachute assembly and the second riser strap defines a left-side riser strap that is the only riser strap on a left-side of the harness assembly that connects to the parachute assembly.

17. The parachute assembly of claim 9, wherein the gap is defined from a forward position to a rear position along the shoulder portion, wherein the gap extends 90° from the forward position to the rear position, wherein the forward position is at a front of the shoulder portion the rear position is at an apex of the shoulder portion.

18. The parachute assembly of claim 9, wherein the gap is defined from a forward position to a rear position along the shoulder portion, wherein the gap extends 180° from the forward position to the rear position, wherein the forward position is at a front of the shoulder portion and the rear position is at a back of the shoulder portion.

* * * * *